(12) United States Patent
Matsuo et al.

(10) Patent No.: US 9,557,476 B2
(45) Date of Patent: Jan. 31, 2017

(54) MULTI-CORE FIBER

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Shoichiro Matsuo, Sakura (JP); Kunimasa Saitoh, Sapporo (JP); Masanori Koshiba, Sapporo (JP)

(73) Assignees: FUJIKURA LTD., Tokyo (JP); NATIONAL UNIVERSITY CORPORATION HOKKAIDO UNIVERSITY, Sapporo-Shi (JP)

( * ) Notice: Subject to any disclaimer, the term of this patent is extended or adjusted under 35 U.S.C. 154(b) by 0 days.

(21) Appl. No.: 14/334,138

(22) Filed: Jul. 17, 2014

(65) Prior Publication Data

US 2015/0316715 A1 Nov. 5, 2015

Related U.S. Application Data

(63) Continuation of application No. PCT/JP2012/082285, filed on Dec. 13, 2012.

(30) Foreign Application Priority Data

Jan. 19, 2012 (JP) .................................. 2012-009459
Jun. 14, 2012 (JP) .................................. 2012-134674

(51) Int. Cl.
*G02B 6/02* (2006.01)
*G02B 6/036* (2006.01)
*G02B 6/028* (2006.01)

(52) U.S. Cl.
CPC ......... *G02B 6/02042* (2013.01); *G02B 6/0286* (2013.01); *G02B 6/0365* (2013.01); *G02B 6/03622* (2013.01)

(58) Field of Classification Search
CPC ................ G02B 6/02; G02B 6/28; G02B 6/36
(Continued)

(56) References Cited

U.S. PATENT DOCUMENTS 5,944,867 A * 8/1999 Chesnoy ........... C03B 37/01205
65/408
6,031,850 A * 2/2000 Cheo ................. H01S 3/094003
372/6

(Continued)

FOREIGN PATENT DOCUMENTS

JP   2010082656 A1 * 7/2010 ......... G02B 6/02042
WO  2011/114795 A1   9/2011

OTHER PUBLICATIONS

Extended European Search Report dated May 15, 2015, issued in counterpart European Patent Application No. 12865553.7 (3 pages).
(Continued)

*Primary Examiner* — Kaveh C Kianni
(74) *Attorney, Agent, or Firm* — Westerman, Hattori, Daniels & Adrian, LLP

(57) ABSTRACT

A multicore fiber includes six or more of core elements having a core, a first clad surrounding the outer circumferential surface of the core and a second clad surrounding the outer circumferential surface of the first clad, and includes a clad surrounding the core elements. All of expressions are satisfied: $n_1 > n_2 > n_3$, $n_1 > n_4$, $n_3 < n_4$, wherein the refractive index of the core is $n_1$, the refractive index of the first clad is $n_2$, the refractive index of the second clad is $n_3$, and the refractive index of the clad is $n_4$. The core elements are disposed so that the inter-center pitch between the cores adjacent to each other is disposed at regular spacing and the centers of the cores are annularly disposed.

7 Claims, 9 Drawing Sheets

(58) Field of Classification Search
USPC .......................................................... 385/124
See application file for complete search history.

(56) References Cited

U.S. PATENT DOCUMENTS

| | | | | |
|---|---|---|---|---|
| 7,027,699 | B2* | 4/2006 | Tao ................. | B29D 11/00721 385/126 |
| 7,580,600 | B1* | 8/2009 | Starodubov .......... | G02B 6/4296 385/124 |
| 8,320,724 | B2* | 11/2012 | Sasaoka ............. | G02B 6/02042 385/121 |
| 8,687,931 | B2* | 4/2014 | Sasaoka ............. | G02B 6/02342 385/125 |
| 8,861,914 | B2* | 10/2014 | Hayashi ............. | G02B 6/02042 385/126 |
| 2002/0176677 | A1* | 11/2002 | Kumar ............... | C03B 37/01222 385/126 |
| 2004/0264513 | A1* | 12/2004 | Shima .................... | C03C 13/04 372/6 |
| 2005/0069269 | A1* | 3/2005 | Libori ................ | G02B 6/02042 385/125 |
| 2007/0036500 | A1* | 2/2007 | Suzuki .................. | B82Y 20/00 385/129 |
| 2007/0266738 | A1* | 11/2007 | Gallagher ......... | C03B 37/01211 65/393 |
| 2011/0052129 | A1* | 3/2011 | Sasaoka ............. | G02B 6/02042 385/126 |
| 2011/0222828 | A1* | 9/2011 | Sasaoka ............. | G02B 6/02042 385/127 |
| 2011/0249940 | A1* | 10/2011 | Sasaoka ............. | G02B 6/02042 385/39 |
| 2011/0274398 | A1* | 11/2011 | Fini ..................... | G02B 6/0365 385/124 |
| 2012/0134637 | A1* | 5/2012 | Imamura ............. | G02B 6/0365 385/127 |
| 2013/0243384 | A1* | 9/2013 | Matsuo ............... | G02B 6/0365 385/127 |
| 2013/0294737 | A1* | 11/2013 | Dianov ............. | G02B 6/02042 385/127 |

OTHER PUBLICATIONS

K. Takenaga et al., "A Large Effective Area Multi-Core Fibre with an Optimised Cladding Thickness", ECOC Technical Digest, 2011, Mo.1. Le Cervin. 2.

B. Zhu et al., "High-Capacity Space-Division-Multiplexed DWDM Transmissions Using Multicore Fiber", Journal of Lightwave Technology, vol. 30, No. 4, Feb. 15, 2012, pp. 486-492.

S. Matsuo et al., "Large-effective-area ten-core fiber with cladding diameter of about 200 μm", Optics Letters, vol. 36, No. 23, Dec. 1, 2011.

ITU-T G.650.2, "Transmission media and optical systems characteristics—Optical fibre cables", International Telecommunication Union, (Version in Jul. 2007).

K. Okuyama et al., "Investigation on Circularly Arranged Multi-Core Fibers for Increasing the Number of Cores", 2012 Nen The Institute of Electronics, Information and Communication Engineers Sogo Taikai Koen Ronbunshu, Mar. 6, 2012, Tsushin 2, p. 547, with partial English translation.

K. Okuyama et al., "Relationship between Crosstalk and Core Density of Circularly Arranged Multi-Core Fibers", 2012 Nen The Institute of Electronics, Information and Communication Engineers Sogo Taikai Koen Ronbunshu 2, Aug. 28, 2012, p. 184, with partial English translation.

* cited by examiner

MULTI-CORE FIBER

TECHNICAL FIELD

The present invention relates to a multi-core fiber that can dispose a large number of cores according to the outer diameter of a clad while suppressing crosstalk.

BACKGROUND ART

Currently, optical fibers used for optical fiber communication systems which are generally spreading adopt a structure in which an outer periphery of one core is surrounded by a clad, and information is transmitted when an optical signal propagates in this core. Further, as the optical fiber communication systems spread, the amount of information to be transmitted is dramatically increasing in recent years. Following an increase in the amount of information to be transmitted, the optical fiber communication systems use several tens or several hundreds of multiple optical fibers to perform long-distance optical communication of a large volume.

It is known that, to reduce the number of optical fibers in such an optical fiber communication system, a plurality of signals are transmitted by means of light propagating in respective cores using a multi-core fiber in which outer peripheries of a plurality of cores are surrounded by one clad.

Non-Patent Document 1 below describes such a multi-core fiber. However, as also pointed out in Non-Patent Document 1, in the multi-core fiber in some cases, crosstalk occurs between optical signals propagating through cores, and noise is superposed on the optical signals propagating through the cores. In order to reduce such crosstalk, Non-Patent Document 2 below describes a so-called trench type multi-core fiber. In the structure of the trench type multi-core fiber, cores are individually surrounded by a first clad having a refractive index equivalent to or slightly different from the refractive index of a clad, the first clad is surrounded by a second clad having a refractive index lower than the refractive indices of the first clad and the clad, and the second clads are individually surrounded by the clad. In the case where the core, the first clad, and the second clad are considered to be a core element and the core element is seen from the viewpoint of the refractive indices, the multi-core fiber is a trench type because the refractive index of the second clad is in a trench. According to such a trench type multi-core fiber, light propagating through the core is more properly confined in the cores. Thus, it is suppressed that light propagating through the cores leaks out of the core element, and the crosstalk between the cores can be reduced.

Moreover, Non-Patent Document 3 below describes that in the case of hexagonal close packing in which a single core is disposed in the center and six cores surround the single core, it is likely that the crosstalk characteristics of the core disposed in the center is degraded.

CITATION LIST

Non-Patent Documents

Non-Patent Document 1: Masanori KOSHIBA "Heterogeneous multi-core fibers: proposal and design principle" IEICE Electronics Express, Vol. 6, No. 2, 98-103

Non-Patent Document 2: Katsuhiro TAKENAGA "A Large Effective Area Multi-core Fiber with Optimised Cladding Thickness" ECOC2011, Mo. 1. LeCervin. 2

Non-Patent Document 3: Jounal of Lightwave Technology, Volume: 30, Issue: 4, Page (s): 486-492 "High Capacity Space-Division-Multiplexed DWDM Transmissions Using Multi-core Fiber"

SUMMARY OF INVENTION

Objects to be Achieved by the Invention

However, in the trench type multi-core fiber, it is pointed out that in a specific core element surrounded by a plurality of cores, the cutoff wavelength is prone to be long because the influence of confinement in a higher mode caused due to a plurality of core elements is great and the communication quality of the specific core is prone to deteriorate. For example, cores are disposed in a so-called one-to-six arrangement in which a single core is disposed in the center and six cores are disposed so as to surround this core. When cores are arranged in hexagonal close packing, the cutoff wavelength of the core in the center is prone to be long. This tendency is noticeable when the inter-center pitch (the core pitch) between cores on the outer circumference side is reduced. Therefore, in the trench type multi-core fiber, it was difficult to reduce the core pitch between a plurality of cores surrounding a specific core. As described above, in the trench type multi-core fiber, in the case of the structure in which cores are arranged in hexagonal close packing and a specific core is surrounded by a plurality of cores, the number of cores that can be disposed in a clad having a predetermined diameter is limited.

Therefore, it is an object of the present invention to provide a multi-core fiber that can dispose a large number of cores according to the outer diameter of a clad while suppressing the crosstalk between cores adjacent to each other.

Means for Achieving the Objects

The present inventors dedicatedly continued investigations in order to achieve the objects. Such an arrangement was considered to be preferable from the viewpoint of effectively utilizing the limited area of a clad, in which in the case where a large number of cores are disposed in a clad having a specific outer diameter as many as possible, cores are arranged in hexagonal close packing in such a way that a regular triangle is formed of lines connecting the centers of the cores adjacent to each other. However, as described above, a specific core surrounded by a plurality of cores has tendency that the cutoff wavelength is prone to be long. Therefore, the present inventors conducted dedicated investigation, and achieved the present invention.

Namely, the multi-core fiber according to the present invention is a multi-core fiber including: six or more of core elements including: a core; a first clad surrounding an outer circumferential surface of the core; and a second clad surrounding an outer circumferential surface of the first clad; and a clad surrounding the core elements. In the multi-core fiber, all of expressions are satisfied:

$n_1 > n_2 > n_3$ $n_1 > n_4$ $n_3 < n_4$ wherein a refractive index of the core is $n_1$, a refractive index of the first clad is $n_2$, a refractive index of the second clad is $n_3$, and a refractive index of the clad is $n_4$. The core elements are disposed so that an inter-center pitch between the cores adjacent to each other is disposed at regular spacings and centers of the cores are annularly disposed.

As described above, in the trench type multi-core fiber, in the case where a core element is disposed in the center, the cutoff wavelength of the core disposed in the center becomes long caused due to a plurality of core elements surrounding this core element. Thus, it is difficult to reduce a plurality of core pitches on the outer circumference side so much. Therefore, as the result of investigations conducted by the present inventors, the conclusion was found that cores are not arranged in hexagonal close packing on purpose and core pitches are reduced in a structure in which a specific core is not surrounded by a plurality of cores, which contrarily results in increasing the number of cores. Moreover, for example, in the case where cores are arranged in hexagonal close packing, when it is desired to dispose the number of cores greater than seven cores in one-to-six arrangement, it is necessary to further dispose cores on the outer circumference side around six cores, and it is necessary to set the outer diameter of a clad as matched with the cores disposed on the outermost circumference, which sometimes causes the outer diameter of the clad to be greater too much. On the contrary, according to the present invention, it is fine to only increase the size of an annular shape in which the center of a core is positioned every time when the number of cores is increased by one, so that the outer diameter of a clad can be finely set every time when a core is increased. In other words, the number of cores matched with the outer diameter of a clad can be disposed. Moreover, the core elements include the trench type refractive index profile, so that the crosstalk between the cores adjacent to each other can be suppressed. Accordingly, according to the present invention, a large number of cores can be disposed according to the outer diameter of a clad while suppressing the crosstalk between cores adjacent to each other.

Moreover, in the case where cores are arranged in hexagonal close packing as described in Non-Patent Document 3 above, suppose that the crosstalk between cores adjacent to each other is −50 dB, the effective crosstalk of a core disposed in the center surrounded by six cores adjacent to each other is −42 dB, whereas the cores disposed on the outer circumference side are adjacent to three cores each other, and the effective crosstalk is −45 dB. As described above, a difference occurs in the crosstalk between the individual cores. However, cores are annularly disposed as in the multi-core fiber according to the present invention, so that the number of cores adjacent to each other is only two. Thus, suppose that the crosstalk between cores adjacent to each other is −50 dB, the effective crosstalk is −47 dB. This crosstalk is the same between any cores, so that crosstalk is not varied between individual cores, and the uniformity of communications as a whole can be secured. Furthermore, in the multi-core fiber according to the present invention, the number of cores adjacent to each other is as small as two, so that an excellent crosstalk can be achieved in the case where cores are arranged in hexagonal close packing as described above.

In addition, preferably, when a number of the core elements is n, the cores are disposed in an n-sided regular polygon.

The fact that cores are disposed in this manner can also be considered that cores are annularly disposed. The cores are disposed in this manner, so that the influence exerted from the adjacent core is made equal between the cores, and the cores can maintain the uniformity of light propagating through the cores.

Alternatively, when a number of the core elements is n, the cores may be disposed in a regular polygon in which n is a number of six or more that is divided by an integer of two or more and the cores are disposed at vertices whose number is a number that n is divided by the integer.

Moreover, preferably, a number of the core elements is a multiple of six, which is 12 or more; and the cores are disposed in a regular hexagon.

For a method of manufacture of a multi-core optical fiber, a stack-and-draw method and a boring method are known. The stack-and-draw method is a method also for use in manufacture of a photonic crystal fiber. In this method, cores are disposed in which cylindrical glass rods including a region to be a core are combined in a close-packed hexagonal lattice. The combined glass rods to be these cores are inserted into a glass tube and solidified to obtain a multi-core fiber base material, and this base material is drawn to obtain a multi-core fiber. In the stack-and-draw method, such multi-core fibers can be easily produced including a seven-core multi-core fiber in which six cores are disposed in a hexagon around a center core and a 19-core multi-core fiber in which 12 cores are disposed in a hexagon around the outer circumference of a seven-core multi-core fiber. For example, in the stack-and-draw method, when a glass rod with no core is used instead of a glass rod to be a core disposed in the center part and 12 glass rods with cores are disposed around the glass rod, such a multi-core fiber can be implemented in which 12 cores are annularly disposed in a hexagon. Also in the case of multi-core fibers having cores whose number is a multiple of six greater than 12 such as 18 cores and 24 cores, these multi-core fibers can be similarly manufactured. Thus, in the case where cores are disposed in a regular hexagon, multi-core fibers including a larger number of cores can be easily manufactured by existing methods.

On the other hand, a multi-core fiber can be implemented by the boring method in which a hole is bored in a glass base material prepared beforehand using a drill, for example, a cylindrical glass rod including a region to be a core is inserted into the hole, and a void is squeezed. In the boring method, since cores can be disposed at given locations in a glass base material, the method is suited to implement cores annularly disposed.

Moreover, preferably, an expression is satisfied:

$$\frac{A_{\mathit{eff}}^{\frac{1}{2}}}{\Lambda^2} \geq 0.0001 XT + 0.01$$

wherein crosstalk when light propagates through the cores for 100 km is XT (dB), effective areas of the cores are $A_{\mathit{eff}}(\mu m^2)$ and an inter-center pitch between the cores adjacent to each other is $\Lambda$.

Such a relationship is satisfied, so that the distortion of light propagating through the cores can be suppressed, and communication quality can be made further excellent.

Furthermore, preferably, a difference of an effective area between of the cores is within 20 ($\mu m^2$).

The difference of the effective area between the cores is within 20 $\mu m^2$, so that the communication quality of the cores can be made uniform, and in the case where a plurality of the multi-core fibers is connected, optical attenuation caused due to connection can be suppressed.

Effect of the Invention

As described above, according to the present invention, there is provided a multi-core fiber that can dispose a large number of cores according to the outer diameter of a clad while suppressing the crosstalk between cores adjacent to each other.

DESCRIPTION OF EMBODIMENTS

Figure 1A:
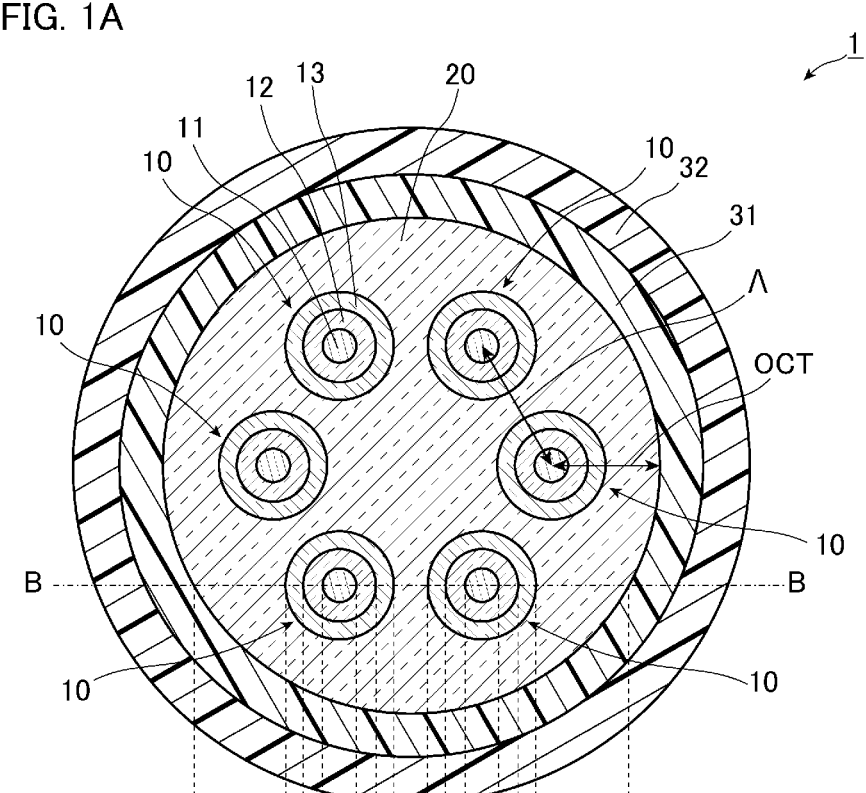
FIGS. 1A and 1B are a view illustrating a state of a multi-core fiber according to an embodiment of the present invention.

A preferred embodiment of a multi-core fiber according to the present invention will be described in detail below referring to the drawings. In addition, for ease of understanding, a scale disclosed in each drawing and a scale disclosed below are different in some cases.

Figure 1B:
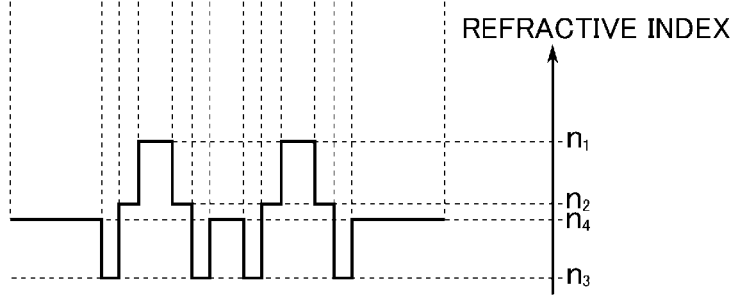

FIGS. 1A and 1B are diagrams of a multi-core fiber according to an embodiment of the present invention. More specifically, FIG. 1A is a diagram of a structure on a cross section perpendicular to the longitudinal direction of the multi-core fiber, and FIG. 1B is a schematic diagram of the refractive index profile along line B-B of the multi-core fiber 1 in FIG. 1A.

As depicted in FIG. 1A, the multi-core fiber 1 according to the embodiment includes a plurality of core elements 10, a clad 20 that surrounds the core elements 10 entirely, fills the space between the core elements 10, and surrounds the outer circumferential surfaces of the core elements 10 with no spacing, an inner protective layer 31 that covers the outer circumferential surface of the clad 20, and an outer protective layer 32 that covers the outer circumferential surface of the inner protective layer 31.

The core elements 10 individually include a core 11, a first clad 12 that surrounds the outer circumferential surface of the core 11 with no spacing, and a second clad 13 that surrounds the outer circumferential surface of the first clad 12 with no spacing. Moreover, the core elements 10 are disposed in such a way that core pitches A of the core elements 10 are equal to each other, and the centers of the cores 11 are arranged in a regular polygon having vertices whose number is the same as the number of the cores 11. Namely, in the case where the number of the cores 11 and 12 is n, the cores 11 and 12 are disposed in an n-sided regular polygon. It is noted that the center of a regular polygon in which the cores 11 are disposed is matched with the axis of the clad 20. The fact that the cores 11 and 12 are disposed in this manner can also be grasped that the cores 11 and 12 are annularly disposed in which the center of the ring is matched with the axis of the clad 20. Therefore, the core element is not disposed in the center of the clad 20, and there is no core element surrounded by a plurality of the core elements. In the embodiment, the diameters of the cores 11 are equal to each other, the outer diameters of the first clads 12 are equal to each other, and the outer diameters of the second clads 13 are equal to each other. Thus, the thicknesses of the first clads 12 are equal to each other, and the thicknesses of the second clads 13 are equal to each other. A diameter $d_1$ of the core is 9 μm, for example, an outer diameter $d_2$ of the first clad 12 is 19 μm, for example, an outer diameter $d_3$ of the second clad 13 is 27 μm, for example, and the core pitch $\Lambda$ is 40 μm, for example. Moreover, a shortest pitch OCT between the centers of the cores 11 and the outer circumferential surface of the clad 20 is 40 μm, for example. Furthermore, the diameter of the clad 20 is 160 μm, for example. It is noted that in the multi-core fiber 1 according to the embodiment, as depicted in FIG. 1A, the number of the cores is six in total.

In addition, refractive indices $n_1$ of the cores 11 are equal to each other, refractive indices $n_2$ of the first clads 12 are equal to each other, and refractive indices $n_3$ of the second clads 13 are equal to each other. The refractive index $n_2$ of the first clad 12 is made lower than the refractive index $n_1$ of the core 11, and the refractive index $n_3$ of the second clad 13 is made much lower than the refractive index $n_2$ of the first clad 12. Moreover, a refractive index $n_4$ of the clad 20 is a refractive index between the refractive index $n_1$ of the core 11 and the refractive index $n_2$ of the second clad 13. In other words, the refractive indices $n_1$ to $n_4$ satisfy all of expressions.

$$n_1 > n_2 > n_3$$

$$n_1 > n_4$$

$$n_3 < n_4$$

Thus, in the case where the core element 10 is seen from the viewpoint of the refractive indices, the core element 10 has a trench structure because the refractive index of the second clad 13 is lower than the refractive indices of the first clad 12 and the clad 20.

It is noted that in FIG. 1B, the refractive indices of an inner protective layer 31 and an outer protective layer 32 are omitted.

As described above, the refractive index $n_3$ of the second clad 13 is made smaller than the refractive index $n_2$ of the first clad 12 and the refractive index $n_4$ of the clad 20, so that light is drawn to the core 11, not on the clad 20 side. Thus, the optical confinement effect of the core 11 is made greater, and it can be suppressed that light propagating through the core 11 leaks out of the core elements 10. The second clad 13 and the clad 20 of low refractive indices then function as barriers, and the crosstalk between the cores 11 adjacent to each other can be reduced.

It is noted that in the embodiment, as depicted in FIG. 1B, the refractive index $n_2$ of the first clad 12 is made higher than the refractive index $n_4$ of the clad 20. However, the refractive index difference of the first clad 12 with respect to the clad 20 may be nearly zero. The refractive index $n_2$ of the first clad 12 may be set between the refractive index $n_4$ of the clad 20 and the refractive index $n_3$ of the second clad 13. The refractive index difference of the first clad 12 with respect to the clad 20 is appropriately set to positive and negative values in order to adjust the wavelength dispersion characteristics.

Moreover, in the embodiment, as described above, the diameters $d_1$ of the cores 11 are equal to each other, the outer diameters $d_2$ of the first clad 12 are equal to each other, and the outer diameters $d_3$ of the second clads 13 are equal to each other. Furthermore, the refractive indices $n_1$ of the cores 11 are equal to each other, the refractive indices $n_2$ of the first clads 12 are equal to each other, and the refractive indices $n_3$ of the second clads 13 are equal to each other. However, such a configuration may be possible in which the diameters $d_1$ and the refractive indices $n_1$ of the cores 11 adjacent to each other are set different from each other in such a way that the effective refractive indices of the cores 11 adjacent to each other are varied. Such configurations may be possible in which the outer diameters $d_2$ and the refractive indices $n_2$ of the first clads 12 adjacent to each other are set different from each other, and in which the outer diameters $d_3$ and the refractive indices $n_3$ of the second clads 13 adjacent to each other are set different from each other. As described above, the effective refractive indices of the cores adjacent to each other are different from each other, so that the propagation constants of the cores adjacent to each other are varied from each other, and the crosstalk can be further reduced.

Next, the number of the core elements that can be disposed in the clad will be described.

Figure 2:
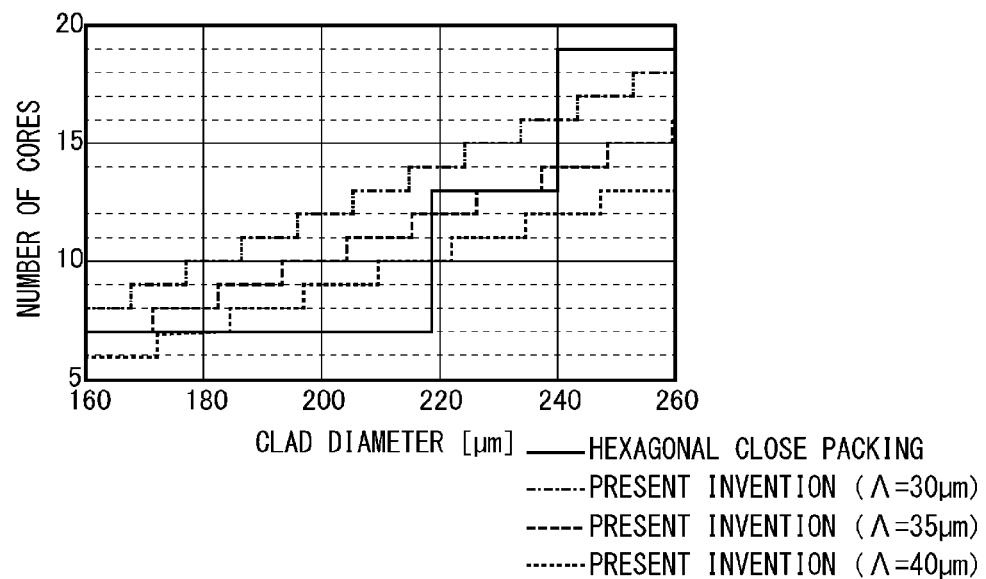
FIG. 2 is a diagram of the relationship between the diameter of a clad and the number of core elements that can be disposed in the clad.

FIG. 2 is a diagram of the relationship between the diameter of a clad and the number of core elements that can be disposed in the clad. In FIG. 2, the horizontal axis expresses the diameter of the clad, and the vertical axis expresses the number of the core elements that can be disposed in the clad in the case where the cores are annularly disposed. In FIG. 2, an effective area $A_{eff}$ of the core was 110 $\mu m^2$ at a wavelength of 1,550 nm, and crosstalk in a length of 100 km was −30 dB. It is noted that in FIG. 2, in order to suppress the production of excess attenuation caused due to the influence of the protective layer covering the clad, the shortest pitch OCT between the center of the core and the outer circumferential surface of the clad was 40 μm.

First, the number of core elements that can be disposed in a clad will be described in the case of hexagonal close packing, which is a typical previously existing arrangement. It is noted that in such an arrangement, it is difficult to reduce the core pitch below 40 μm from the viewpoint that light in a higher mode is trapped in the core in the center. From FIG. 2, in the case where the core pitch is 40 μm, when the outer diameter of the clad is 160 μm or more, one core element can be disposed in the center, and six core elements can be disposed around the core element. Namely, the core elements can be disposed in one-to-six arrangement, and seven core elements can be disposed. However, it is difficult to dispose core elements exceeding seven core elements because of dimensions until the diameter of the clad reaches 219 μm or more. When the diameter of the clad is 219 μm or more, six core elements can be disposed further on the outer circumference side, and the core elements can be disposed in one-to-six-to-six arrangement, so that the number of the core elements can be made 13. In other words, even in the case where the outer diameter of the clad is greater than 160 μm, it is difficult to gradually increase the number of cores as matched with the outer diameter of the clad. Moreover, in the case where the outer diameter of the clad is 219 μm or more, it is difficult to increase the number of the core elements exceeding 13 until the diameter of the clad reaches 240 μm or more. When the diameter of the clad is 240 μm or more, the number of the core elements on the outermost circumference can be increased from six to twelve, and the core elements can be disposed in one-to-six-to-twelve arrangement, so that the number of the cores can be made 19. In other words, even in the case where the outer diameter of the clad is greater than 219 μm, it is difficult to gradually increase the number of cores as matched with the outer diameter of the clad. As described above, in the previously existing multi-core fiber, it was difficult that the number of core elements is gradually increased every time when the outer diameter of a clad is increased. In other words, it was difficult to dispose a large number of cores according to the outer diameter of a clad.

Next, the number of the core elements that can be disposed in the clad will be described in a form in which the core elements are disposed in such a way that an inter-center pitch between the cores adjacent to each other is provided at regular spacings and the centers of the cores are annularly disposed in the multi-core fiber according to the present invention.

First, as similar to the foregoing previously existing multi-core fiber, the number of the core elements that can be disposed in the clad will be described in the case where the core pitch is 40 μm. From FIG. 2, in the case where the core pitch is 40 μm, six core elements can be disposed when the diameter of the clad is 160 μm. The multi-core fiber 1 depicted in FIGS. 1A and 1B are in this state. Seven core elements can be disposed when the outer diameter of the clad is 172 μm or more, eight core elements can be disposed when the outer diameter of the clad is 184 μm or more, and nine core elements can be disposed when the outer diameter of the clad is 196 μm or more. Moreover, the number of the core elements that can be disposed is 10 when the outer diameter of the clad is 209 μm or more. The number of the core elements that can be disposed is 11 when the outer diameter of the clad is 221 μm or more. The number of the core elements that can be disposed is 12 when the outer diameter of the clad is 234 μm or more. The number of the core elements that can be disposed is 13 when the outer diameter of the clad is 247 μm or more. As described above, in accordance with the multi-core fiber according to the present invention, in the case where the core pitch is 40 μm, the number of the core elements can be from eight to ten in a part (diameters from 160 μm to 219 μm) of the range of the clad diameter in which only seven core elements can be disposed in the previously existing multi-core fiber (diameters from 184 μm to 219 μm), and a larger number of the core elements can be disposed according to the outer diameter of the clad than in the previously existing multi-core fiber.

As described above, in previously existing hexagonal close packing, it is difficult to reduce the core pitch below 40 μm. However, in accordance with the multi-core fiber according to the present invention, the core pitch can be made smaller than 40 μm. Therefore, next, the number of the core elements that can be disposed in the clad will be described in the case where the core pitch is 35 μm. From FIG. 2, in the case where the core pitch is 35 μm, six core elements can be disposed even though the diameter of the clad is less than 160 μm. Seven core elements can be disposed when the outer diameter of the clad is 160 μm or more, eight core elements can be disposed when the outer diameter of the clad is 171 μm or more, and nine core elements can be disposed when the outer diameter of the clad is 182 μm or more. Moreover, the number of the core elements that can be disposed is 10 when the outer diameter of the clad is 193 μm or more. The number of core elements that can be disposed is 11 when the outer diameter of the clad is 204 μm or more. The number of the core elements that can be disposed is 12 when the outer diameter of the clad is 215 μm or more. The number of the core elements that can be disposed is 13 when the outer diameter of the clad is 226 μm or more. The number of the core elements that can be disposed is 14 when the outer diameter of the clad is 237 μm or more. The number of the core elements that can be disposed is 15 when the outer diameter of the clad is 248 μm or more. The number of the core elements that can be disposed is 16 when the outer diameter of the clad is 259 μm or more. As described above, in accordance with the multi-core fiber according to the present invention, the core pitch is set to 35 μm, so that the number of the core elements can be from eight to twelve in many areas (diameters from 171 μm to 219 μm) in the range of the clad diameter in which only seven core elements can be disposed in the previously existing multi-core fiber (diameters from 160 μm to 219 μm), and a larger number of the core elements can be disposed according to the outer diameter of the clad than in the previously existing multi-core fiber.

Next, the number of the core elements that can be disposed in the clad will be described in the case where the core pitch is 30 μm. From FIG. 2, in the case where the core pitch is 30 μm, when the diameter of the clad is 160 μm, eight core elements can be disposed, and a larger number of cores can be disposed than in the core element arrangement by previously existing hexagonal close packing. Nine core elements can be disposed when the outer diameter of the clad is 167 μm or more. Moreover, the number of the core elements that can be disposed is 10 when the outer diameter of the clad is 177 μm or more. The number of the core elements that can be disposed is 11 when the outer diameter of the clad is 186 μm or more. The number of the core elements that can be disposed is 12 when the outer diameter of the clad is 195 μm or more. The number of the core elements that can be disposed is 13 when the outer diameter of the clad is 205 μm or more. The number of the core elements that can be disposed is 14 when the outer diameter of the clad is 214 μm or more. The number of the core elements that can be disposed is 15 when the outer diameter of the clad is 224 μm or more. The number of the core elements that can be disposed is 16 when the outer diameter of the clad is 233 μm or more. As described above, in accordance with the multi-core fiber according to the present invention, the core pitch is 30 μm, so that eight to fourteen core elements can be disposed according to the outer diameter of the clad in the entire range of the clad diameter in which only seven core elements can be disposed in the previously existing multi-core fiber (diameters from 160 μm to 219 μm).

The optical fiber is often disposed in the bent state, not linearly. In the case where the optical fiber is disposed as bent, preferably, the outer diameter of the clad is 200 μm or less in order to suppress the probability of fatigue failure to be low. This is described in detail in "Large-effective-area ten-core fiber with cladding diameter of about 200 maikurom" Optics Letters, Vol. 36, Issue 23, pp. 4626-4628 (2011). As described above, in the case where the outer diameter of the clad is 200 μm or less, only seven core elements are disposed in previously existing hexagonal close packing from FIG. 2. However, in accordance with the multi-core fiber according to the present invention, the core pitch is reduced, for example, according to the outer diameter of the clad, so that six to twelve core elements can be disposed.

As described above, in the multi-core fiber including the trench type core elements, the core pitch is reduced in the structure in which core elements are not arranged in hexagonal close packing on purpose and a specific core element is not surrounded by a plurality of cores, so that the number of the core elements can be increased according to the outer diameter of the clad. Moreover, the core elements include the trench type refractive index profile, so that the crosstalk between the cores adjacent to each other can be suppressed. As described above, in accordance with the multi-core fiber according to the embodiment, a large number of cores can be disposed according to the outer diameter of a clad while suppressing the crosstalk between cores adjacent to each other.

Next, the effective areas (effective areas) $A_{eff}$ of the cores will be described. Desirably, the difference of the effective area $A_{eff}$ between the cores are within 20 μm$^2$ from the viewpoints of the uniformity of the transmission characteristics of light propagating through the cores and preventing attenuation caused due to connection in the case where a plurality of optical fibers is connected.

Here, let us consider two optical fibers in which the mode field diameters of cores are different from each other for $MFD_1$ and $MFD_2$. A splicing loss in the case where these optical fibers are connected to each other is given from Expression (1) below.

$$a = -10\log\left(\frac{2\frac{MFD_1}{2}\frac{MFD_2}{2}}{\left(\frac{MFD_1}{2}\right)^2 + \left(\frac{MFD_2}{2}\right)^2}\right) \quad (1)$$

From Expression (1), it is shown that attenuation caused due to connection is 0.06 dB and no trouble is caused in practical use of the optical fiber even though the difference in the mode field diameter MFD is about 1 μm. Moreover, single mode fibers generally widely used are defined in ITU-T G.652 Recommendation (Version in November 2009), and the tolerance of the mode field diameter MFD is defined as ±0.6 μm. Furthermore, long distance transmission fibers such as submarine lines are defined in ITU-T G.654 Recommendation (December in 2006), and the tolerance of the mode field diameter is specified in ±0.7 μm. The tolerances are defined from the viewpoint of splicing losses including axial displacement. Therefore, as described above, when the mode field diameter difference is 1 μm or less, splicing losses low enough also in compliance with international recommendations can be achieved.

In addition, the relationship between the mode field diameter MFD of light propagating through the optical fiber and the effective area $A_{\it eff}$ at this time is expressed by Expression (2) below.

$$A_{\it eff} = k\frac{\pi}{4}(MFD)^2 \quad (2)$$

wherein, k is a coefficient depending on the refractive index of the core. According to ITU-T G.650.2, Transmission Media and Optical Systems Characteristics—Optical Fibre Cables (Version in July 2007), in a typical optical fiber, k generally takes a value ranging from 0.960 to 0.985. From Expression (2) above, the difference in the mode field diameter MFD is about 1 μm between an optical fiber whose effective area $A_{\it eff}$ of the core is 100 μm² and an optical fiber whose effective area $A_{\it eff}$ of the core is 120 μm². Thus, even though a plurality of multi-core fibers in which the difference of the effective area $A_{\it eff}$ between the cores is within 20 μm² is connected, splicing losses can be sufficiently reduced.

Although the present invention has been described above by reference to a certain embodiment as an example, the present invention is not limited thereto.

Figure 3:
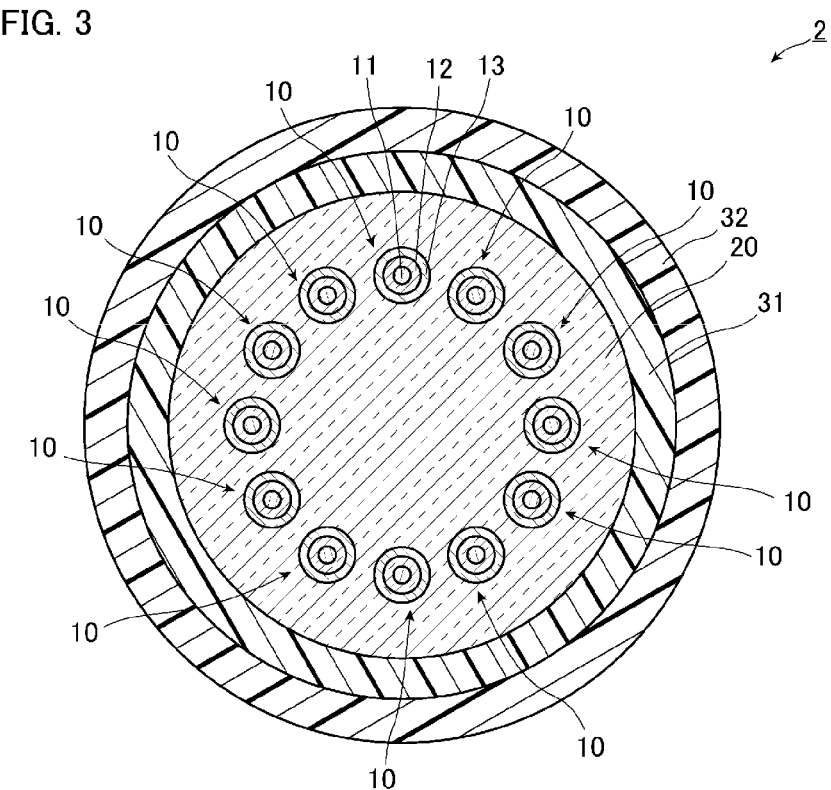
FIG. 3 is a diagram of a first exemplary modification of the multi-core fiber according to the embodiment.

For example, in the embodiment above, the number of the cores is six. However, the number is not limited specifically as long as the number of the cores is six or more. FIG. 3 is a diagram of an example of this multi-core fiber, and is a diagram of a first exemplary modification of the multi-core fiber according to the embodiment. It is noted that in describing FIG. 3, components the same as or equivalent to the components of the embodiment are designated the same reference numerals and signs, and the overlapping description is omitted unless otherwise specified. In a multi-core fiber 2 depicted in FIG. 3, the number of the core elements 10 according to the embodiment is increased, and the number of the core elements is 12 in total. The cores 11 are disposed in a regular dodecagon in which the inter-center pitches between the cores 11 are equal to each other and the center is aligned with the axis of the clad 20. It is noted that it can be thought as well that the cores 11 are annularly disposed in which the center is aligned with the axis of the clad 20. In this case, in the case where the core pitch is 35 μm, the diameter of the clad 20 is 215 μm, and in the case where the core pitch is 30 μm, the diameter of the clad 20 is 196 μm. With these structures, a sufficient reliability can be obtained. As described above, even in the case where the number of the cores 11 (the number of the core elements 10) is great, the core pitch is reduced, so that the number of the core elements 10 can be increased according to the outer diameter of the clad 20.

Figure 4:
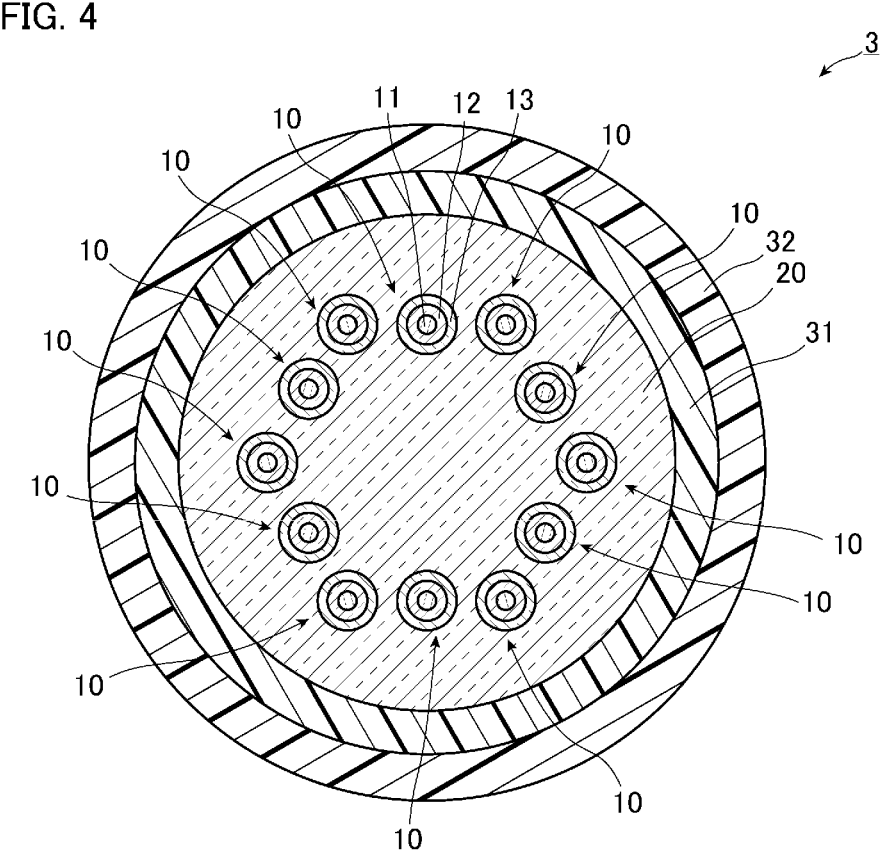
FIG. 4 is a diagram of a second exemplary modification of the multi-core fiber according to the embodiment.

Moreover, in the case where the number of the core elements 10 is n, the core 11 may not be disposed in an n-sided regular polygon. FIG. 4 is a diagram of an example of this multi-core fiber, and is a diagram of a second exemplary modification of the multi-core fiber according to the embodiment. It is noted that in describing FIG. 4, components the same as or equivalent to the components of the embodiment are designated the same reference numerals and signs, and the overlapping description is omitted unless otherwise specified. In a multi-core fiber 3 depicted in FIG. 4, as similar to the multi-core fiber depicted in FIG. 3, the number of the core elements 10 according to the embodiment is increased, and the number of the core elements is 12 in total. The cores 11 are disposed in a regular hexagon as a whole in which the inter-center pitches are equal to each other. In other words, a regular hexagon is formed in which the cores are disposed at six vertices and on six sides and the core pitches are equal to each other. In this case, in the case where the core pitch is 35 μm, the diameter of the clad 20 is 220 μm, and in the case where the core pitch is 30 μm, the diameter of the clad 20 is 200 μm. Even with these structures, a sufficient reliability can be obtained. In the case where the cores are disposed in a hexagon as a whole as in the second exemplary modification, this case is preferable from the viewpoint of easily disposing a glass rod having a core in manufacture of a multi-core fiber using the stack-and-draw method.

Furthermore, although not depicted in the drawing particularly, in a multi-core fiber including eight core elements, eight cores may be disposed in a regular octagon. For example, eight cores may be disposed in a regular quadrilateral. In the case where cores are disposed in a regular quadrilateral, such a configuration may be possible in which a single core is disposed at individual vertices and a single core is disposed on the middle point of the sides of a quadrilateral. In the case where eight cores are disposed in a regular octagon, the diameter of the clad is 193 μm when the core pitch is 40 μm. In the case where the core pitch is 35 μm, the diameter of the clad is 171 μm. In the case where the core pitch is 30 μm, the diameter of the clad is 153 μm. On the other hand, in the multi-core fiber in which eight cores are disposed in a regular quadrilateral as described above, when the core pitch is 40 μm, the diameter of the clad is 193 μm. In the case where the core pitch is 35 μm, the diameter of the clad is 179 μm. In the case where the core pitch is 30 μm, the diameter of the clad is 165 μm. Even with these structures, a sufficient reliability can be obtained, and the number of the core elements can be increased according to the outer diameter of the clad.

As described above, when the number of the core elements is n (n is six or more), even in the case where the cores are not disposed in an n-sided polygon as a whole, preferably, as in the exemplary modification, the cores are disposed in a regular polygon as a whole in which the center of the core is matched with the axis of the clad, the cores are disposed at vertices and on sides, and the core pitches are equal, so that the number of the core elements can be increased according to the outer diameter of the clad. In this case, the number of the vertices of a regular polygon is a number that the number of the cores is divided by an integer of two or more. Thus, n is a number divided by an integer of two or more. For example, in the case where cores are disposed in a regular hexagon as described above, such a configuration may be possible in which the number of the core elements is a multiple of six, which is 12 or more, and the cores are disposed in a regular hexagon, in addition to the configuration in which the number of the core elements is six and the cores are disposed in a regular hexagon.

It is noted that in order to dispose the largest number of the cores in the clad, in the case where the number of the cores is n, preferably, the cores are disposed in an n-sided regular polygon as in the embodiment and the first exemplary modification.

EXAMPLES

Hereinafter, although the present invention will be more concretely explained with examples and comparative examples, the present invention is not limited thereto.

First Example

Such a multi-core fiber was examined in which six or more of core elements having the refractive index profile depicted in FIG. 1B were disposed in such a way that a pitch between cores adjacent to each other was equal and the centers of the cores were annularly disposed in a clad. In this multi-core fiber, $r_2/r_1=2.0$, and $w/r_1=1.1$, where the radius of the core was $r_1$, the radius of a first clad was $r_2$, and the thickness of a second clad was w. Moreover, a refractive index difference $\Delta_2$ of the first clad with respect to the clad was zero, and a refractive index difference $\Delta_2$ of the second clad with respect to the clad was −0.7%, and the core pitch $\Lambda$ was 34 μm.

Here, it is known that a crosstalk XT in the case where a multi-core fiber having a length L is bent at a radius R is given by Expression (3) below.

$$XT = 2\frac{\kappa^2}{\beta}\frac{R}{\Lambda}L \quad (3)$$

wherein, κ is the coupling coefficient of the cores adjacent to each other, and β is a propagation constant.

Figure 5:
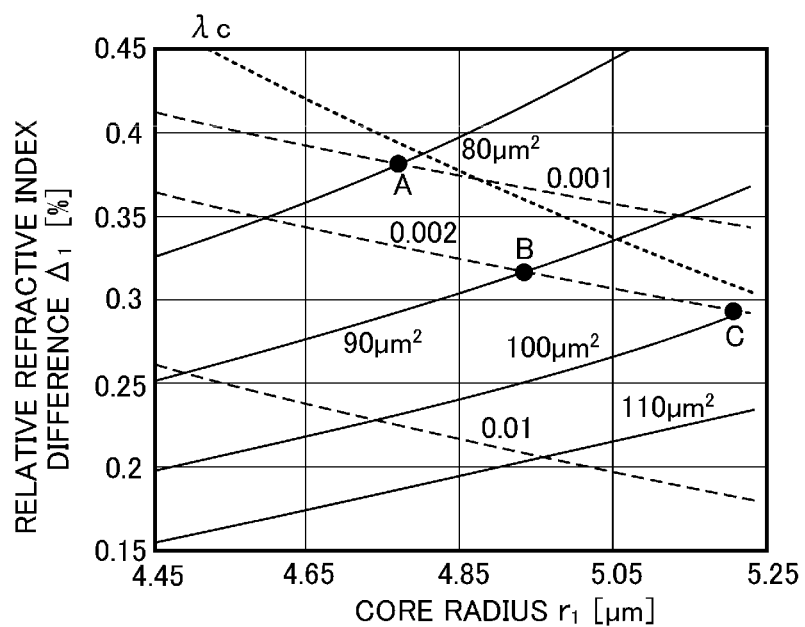
FIG. 5 is a diagram of plotting the distributions of the effective area of a core, the coupling coefficient, and the cutoff wavelength with respect to the radius of the core and the refractive index difference of the core with respect to a clad according to a first example.

Here, FIG. 5 is the effective area $A_{eff}$ of the core, the coupling coefficient κ, and the distribution of the cutoff wavelength with respect to the radius $r_1$ of the core and the refractive index difference $\Delta_1$ of the core with respect to the clad.

In FIG. 5, the horizontal axis expresses the radius $r_1$ of the core, and the vertical axis expresses the refractive index difference $\Delta_1$ of the core with respect to the clad. Moreover, λc indicated by a dotted line expresses a parameter at which the cutoff wavelength is 1,530 nm. In order to implement an optical fiber that ensures single mode transmission at a waveband of 1.5 μm, it is necessary to use parameters in the region at the lower left of λc indicated by the dotted line.

In FIG. 5, solid lines express the distributions of the effective area $A_{eff}$. More specifically, the solid lines express the distributions in which the effective area $A_{eff}$ is 80 μm², 90 μm², 100 μm², and 110 μm². Moreover, broken lines express the distributions of the coupling coefficient κ. More specifically, the broken lines express the distributions in which the coupling coefficient κ is 0.001, 0.002, and 0.01. Here, in FIG. 5, point A, point B, and point C were examined, where point A was a point at which the effective area $A_{eff}$ has the coupling coefficient κ and a solution on a line of 80 μm², point B was a point at which the effective area $A_{eff}$ has the coupling coefficient κ and a solution on a line of 90 μm², and point C was a point at which the effective area $A_{eff}$ has the coupling coefficient κ and a solution on a line of 100 κm². As depicted in FIG. 5, in the example, a result was obtained that point A can be plotted on the line at which the coupling coefficient κ is 0.001, point B can be plotted on the line at which the coupling coefficient κ is 0.002, and point C can be plotted on the line at which the coupling coefficient κ is 0.002 in the region on the left side of the cutoff wavelength λc that can be used for the optical fiber.

Furthermore, suppose that the length L of the multi-core fiber is 100 km and the bending radius R is 200 mm, the crosstalk XT at point A is −37 dB, and the crosstalk XT at point B and point C, at which the coupling coefficients κ are equal to each other, is −31 dB from Expression (3) above. Such crosstalk values are values sufficiently practically usable for the optical fiber.

Figure 6:
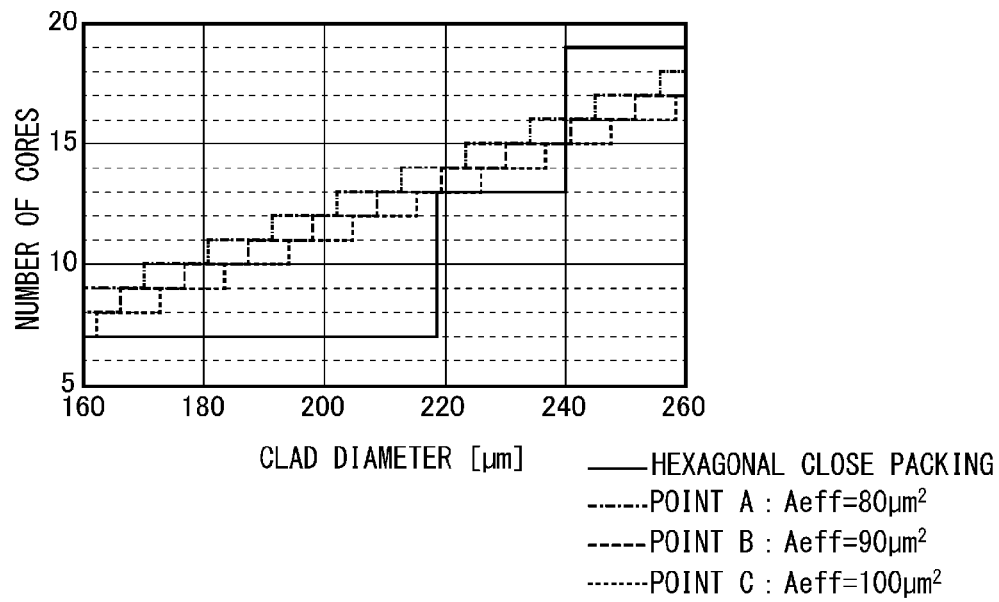
FIG. 6 is a diagram of the relationship between the outer diameter of a clad and the number of core elements at point A, point B, and point C according to the first example.

Next, FIG. 6 is the relationship between the outer diameter of the clad and the number of the cores at point A, point B, and point C. It is noted that it is known that in the case where the effective area $A_{eff}$ is 80 μm², the shortest pitch between the center of the core and the outer circumferential surface of the clad may be 30 μm or more, and in the case where the effective area $A_{eff}$ is 110 μm², the shortest pitch between the center of the core and the outer circumferential surface of the clad may be 40 μm or more. Therefore, in FIG. 6, the shortest pitch between the center of the core and the outer circumferential surface of the clad is linearly interpolated based on the facts above, the shortest pitch between the center of the core and the outer circumferential surface of the clad is found in a given effective area, and then the number of the cores that can be disposed is found. It is noted that FIG. 6 also depicts the relationship between the outer diameter of the clad and the number of the cores in the case of previously existing hexagonal close packing depicted in FIG. 2. From FIG. 6, the effective area $A_{eff}$ of the core is appropriately changed, so that seven to fourteen cores can be disposed according to the outer diameter of the clad in the range of the clad diameter in which only seven core elements can be disposed in the previously existing multi-core fiber (diameters from 160 μm to 219 μm), and sixteen cores at the maximum can be disposed in the range of the clad diameter in which only thirteen core elements can be disposed in the previously existing multi-core fiber (diameters from 219 μm to 240 μm).

As described above, in accordance with the multi-core fiber according to the present invention, it is shown that a large number of cores can be disposed according to the outer diameter of the clad.

Second Example

Figure 7:
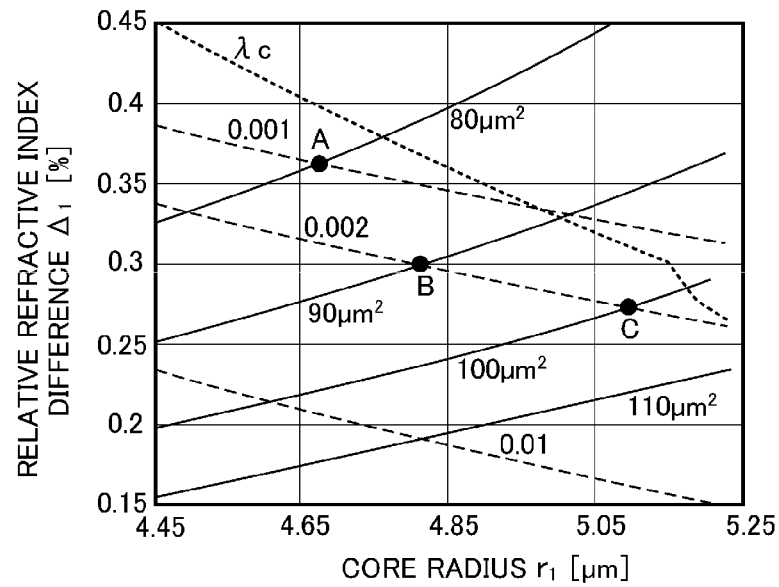
FIG. 7 is a diagram of plotting the distributions of the effective area of a core, the coupling coefficient, and the cutoff wavelength with respect to the radius of the core and the refractive index difference of the core with respect to a clad according to a second example.

A multi-core fiber similar to the first example was examined except that a thickness w of a second clad was increased and $w/r_1=1.2$ was set. FIG. 7 is the effective area $A_{eff}$ of a core, the coupling coefficient κ, and the distribution of the cutoff wavelength λc in the relationship between the radius $r_1$ of the core in this case and the refractive index difference $\Delta_1$ of the core with respect to a clad. It is noted that the method in FIG. 7 is the same as the method in FIG. 5. In FIG. 7, point A, point B, and point C were examined under the conditions the same as the conditions that the effective area $A_{eff}$ of the core is located at point A, point B, and point C in the first example. As a result, the coupling coefficients κ at point A, point B, and point C were similar to the coupling coefficients κ at point A, point B, and point C in the first example, and point A, point B, and point C were apart from the line of the cutoff wavelength λc from point A, point B, and point C in the first example. Thus, it is shown that the design is more suited than the design according to the first example by increasing the second clad.

Third Example

Figure 8:
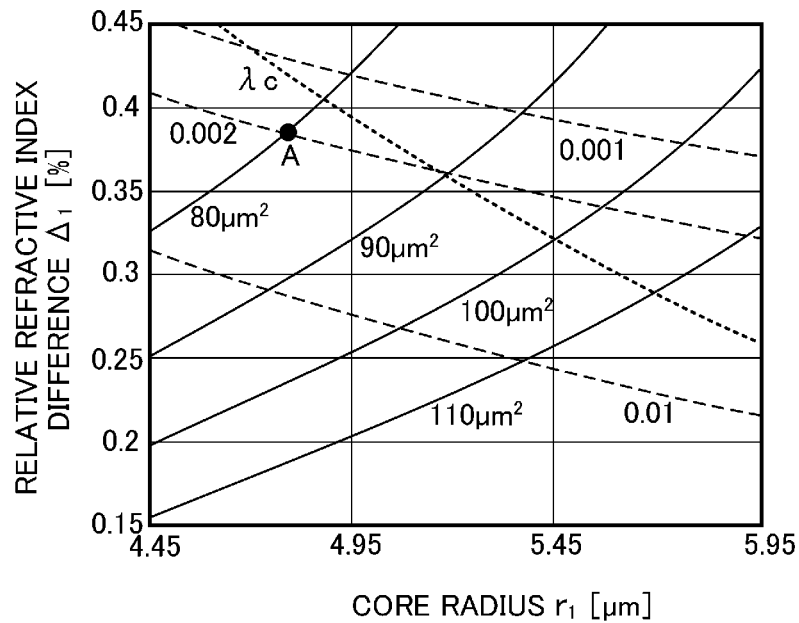
FIG. 8 is a diagram of plotting the distributions of the effective area of a core, the coupling coefficient, and the cutoff wavelength with respect to the radius of the core and the refractive index difference of the core with respect to a clad according to a third example.

A multi-core fiber similar to the multi-core fiber according to the first example was examined except that a ratio between the thickness w of a second clad and the radius $r_1$ of a core was $w/r_1=0.8$ and the core pitch Λ was 35 μm. The effective area $A_{eff}$ of a core, the coupling coefficient κ, and the distribution of the cutoff wavelength λc were examined in the relationship between the radius $r_1$ of the core in this case and the refractive index difference $\Delta_1$ of the core with respect to a clad. This is depicted in FIG. 8 as similar to the method in FIG. 5. Point A was a point at which the effective area $A_{eff}$ has the coupling coefficient κ and a solution on a line of 80 μm² the same as point A in the first example. As depicted in FIG. 8, a result was obtained that the case of the example, point A can be plotted on the line at which the coupling coefficient κ is 0.002 in the region on the left side of the cutoff wavelength λc that can be used for the optical fiber.

Fourth Example

Figure 9:
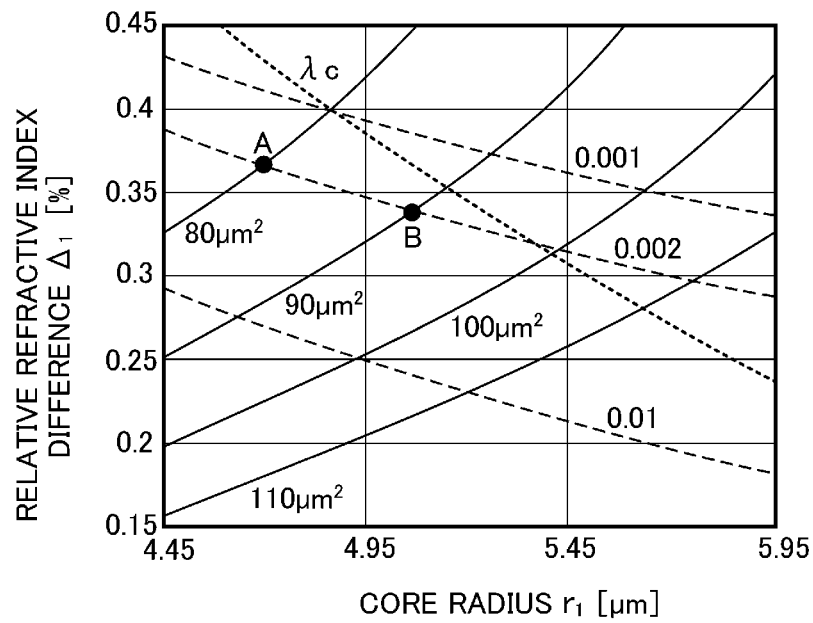
FIG. 9 is a diagram of plotting the distributions of the effective area of a core, the coupling coefficient, and the cutoff wavelength with respect to the radius of the core and the refractive index difference of the core with respect to a clad according to a fourth example.

A multi-core fiber similar to the multi-core fiber according to the first example was examined except that a ratio between the thickness w of a second clad and the radius $r_1$ of a core was $w/r_1=0.9$ and the core pitch Λ was 35 μm. The effective area $A_{eff}$ of a core, the coupling coefficient κ, and the distribution of the cutoff wavelength λc were examined in the relationship between the radius $r_1$ of the core in this case and the refractive index difference $\Delta_1$ of the core with respect to a clad. This is depicted in FIG. 9 as similar to the method in FIG. 5. Point A was a point at which the effective area $A_{eff}$ has the coupling coefficient κ and a solution on a line of 80 μm² the same as point A in the first example, and point B was a point at which the effective area $A_{eff}$ has the coupling coefficient κ and a solution on a line of 90 μm² the same as point B in the first example. As depicted in FIG. 9, a result was obtained that both of point A and point B can be plotted on the lines at which the coupling coefficient κ is 0.002 in the region on the left side of the cutoff wavelength λc that can be used for the optical fiber.

Fifth Example

Figure 10:
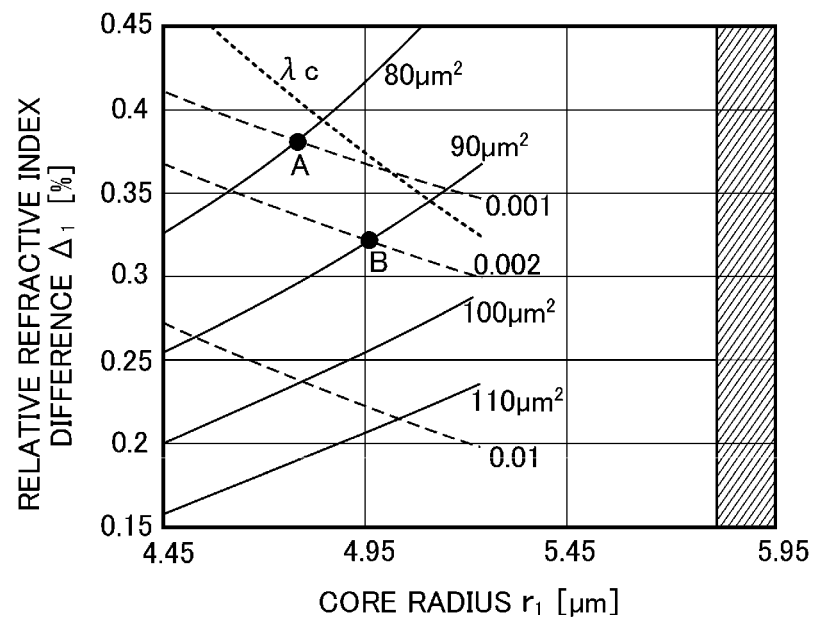
FIG. 10 is a diagram of plotting the distributions of the effective area of a core, the coupling coefficient, and the cutoff wavelength with respect to the radius of the core and the refractive index difference of the core with respect to a clad according to a fifth example.

A multi-core fiber similar to the multi-core fiber according to the first example was examined except that a ratio between the thickness w of a second clad and the radius $r_1$ of a core was $w/r_1=1.0$ and the core pitch Λ was 35 μm. The effective area $A_{eff}$ of a core, the coupling coefficient κ, and the distribution of the cutoff wavelength λc were examined in the relationship between the radius $r_1$ of the core in this case and the refractive index difference $\Delta_1$ of the core with respect to a clad. This is depicted in FIG. 10 as similar to the method in FIG. 5. It is noted that the hatched region depicted in FIG. 10 expresses the region in which the layers of the second clads of core elements adjacent to each other are overlapped with each other. In the example, the region corresponds to $r_1=5.83$ μm. Point A was a point at which the effective area $A_{eff}$ has the coupling coefficient κ and a solution on a line of 80 μm² the same as point A in the first example, and point B was a point at which the effective area $A_{eff}$ has the coupling coefficient κ and a solution on a line of 90 μm² the same as point B in the first example. As depicted in FIG. 10, a result was obtained that point A can be plotted on the line at which the coupling coefficient κ is 0.001 and point B can be plotted on the line at which the coupling coefficient κ is 0.002 in the region on the left side of the cutoff wavelength λc that can be used for the optical fiber.

Sixth Example

Figure 11:
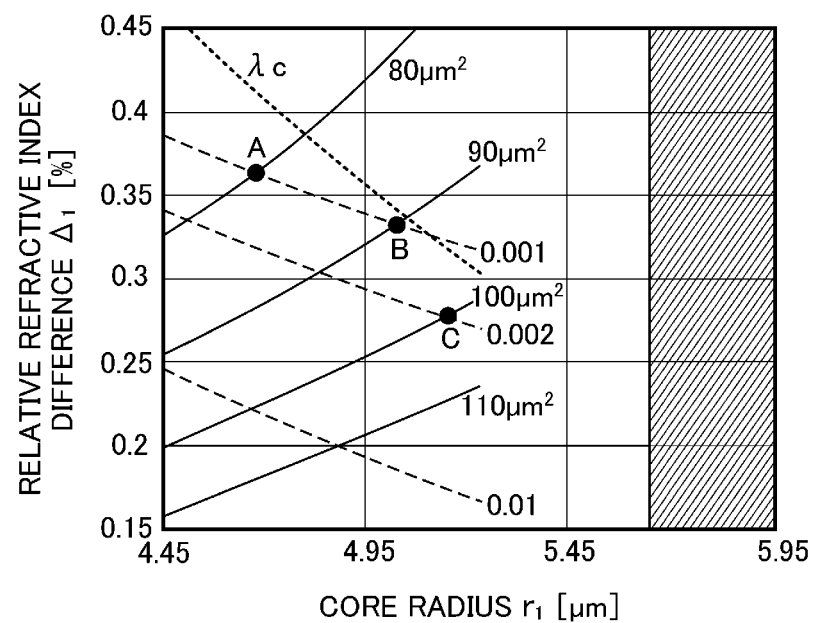
FIG. 11 is a diagram of plotting the distributions of the effective area of a core, the coupling coefficient, and the cutoff wavelength with respect to the radius of the core and the refractive index difference of the core with respect to a clad according to a sixth example.

A multi-core fiber similar to the multi-core fiber according to the first example was examined except that a ratio between the thickness w of a second clad and the radius $r_1$ of a core was $w/r_1=1.1$ and the core pitch Λ was 35 μm. The effective area $A_{eff}$ of a core, the coupling coefficient κ, and the distribution of the cutoff wavelength λc were examined in the relationship between the radius $r_1$ of the core in this case and the refractive index difference $\Delta_1$ of the core with respect to a clad. This is depicted in FIG. 11 as similar to the method in FIG. 5. Point A was a point at which the effective area $A_{eff}$ has the coupling coefficient κ and a solution on a line of 80 μm² the same as point A in the first example. Point B was a point at which the effective area $A_{eff}$ has the coupling coefficient κ and a solution on a line of 90 μm² the same as point B in the first example. Point C was a point at which the effective area $A_{eff}$ has the coupling coefficient κ and a solution on a line of 100 μm² the same as point C in the first example. As depicted in FIG. 11, a result was obtained that both of point A and point B can be plotted on the lines at which the coupling coefficient κ is 0.001 and point C can be plotted on the line at which the coupling coefficient κ is 0.002 in the region on the left side of the cutoff wavelength λc that can be used for the optical fiber.

Seventh Example

Figure 12:
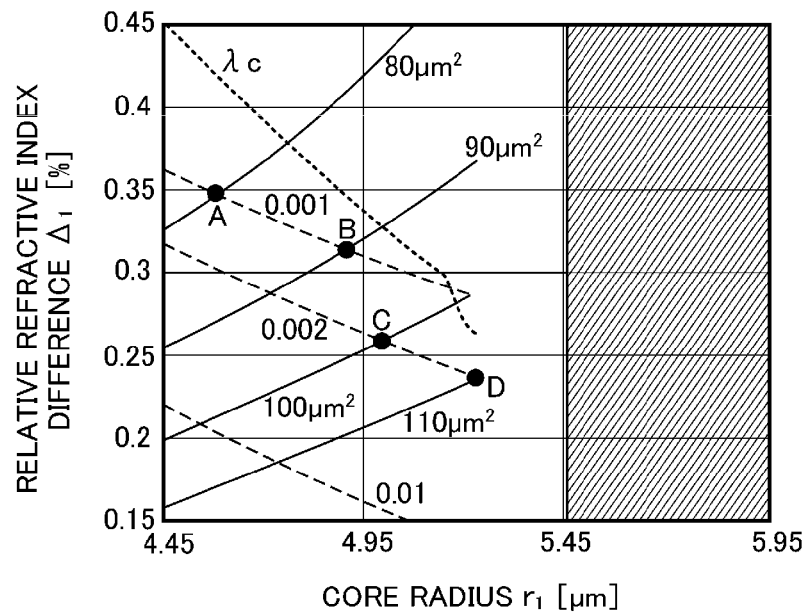
FIG. 12 is a diagram of plotting the distributions of the effective area of a core, the coupling coefficient, and the cutoff wavelength with respect to the radius of the core and the refractive index difference of the core with respect to a clad according to a seventh example.

A multi-core fiber similar to the multi-core fiber according to the first example was examined except that a ratio between the thickness w of a second clad and the radius $r_1$ of a core was $w/r_1=1.2$ and the core pitch Λ was 35 μm. The effective area $A_{eff}$ of a core, the coupling coefficient κ, and the distribution of the cutoff wavelength λc were examined in the relationship between the radius $r_1$ of the core in this case and the refractive index difference $\Delta_1$ of the core with respect to a clad. This is depicted in FIG. 12 as similar to the method in FIG. 5. Point A was a point at which the effective area $A_{eff}$ has the coupling coefficient κ and a solution on a line of 80 μm² the same as point A in the first example. Point B was a point at which the effective area $A_{eff}$ has the coupling coefficient κ and a solution on a line of 90 μm² the same as point B in the first example. Point C was a point at which the effective area $A_{eff}$ has the coupling coefficient κ and a solution on a line of 100 μm² the same as point C in the first example. Point D was a point at which the effective area $A_{eff}$ has the coupling coefficient κ and a solution on a line of 110 μm². As depicted in FIG. 11, a result was obtained that both of point A and point B can be plotted on the lines at which the coupling coefficient κ is 0.001, and point C and point D can be plotted on the line at which the coupling coefficient κ is 0.002 in the region on the left side of the cutoff wavelength λc that can be used for the optical fiber. As a result in the example, it was made possible that point D is plotted, which was not plotted in the first example.

As depicted from FIGS. 8 to 12, it is shown that the ratio $w/r_1$ between the thickness w of the second clad and the radius $r_1$ of the core is increased and a solution having a smaller coupling coefficient κ exists even though the effective areas of the cores are the same. In other words, in the case of point A at which the effective area $A_{eff}$ of the core is 80 μm², the coupling coefficient κ is 0.002 in the third example and the fourth example, whereas the coupling coefficient κ is 0.001 in the fifth example to the seventh example. The similar things are applicable to point B and point C. This expresses from Expression (3) that crosstalk is made smaller. Thus, it was shown that even in the case where the effective area $A_{eff}$ of the core is increased, the ratio w/r₁ is increased, so that such a multi-core fiber can be implemented in which crosstalk is suppressed can be suppressed.

Moreover, it was shown that the ratio w/r₁ between the thickness w of the second clad and the radius r₁ of the core is increased, so that the effective area $A_{eff}$ of the core can be increased while maintaining the same crosstalk characteristics. In other words, in the fourth example, the ratio w/r₁ between the thickness w of the second clad and the radius r₁ of the core is increased more than in the third example, so that it was made possible that a solution in which the effective area $A_{eff}$ of the core is 90 μm² is obtained, which was not obtained in the third example, and point B is plotted. Similarly, in the sixth example, the ratio w/r₁ between the thickness w of the second clad and the radius r₁ of the core is increased more than in the third example to the fifth example, so that it was made possible that a solution in which the effective area $A_{eff}$ of the core is 100 μm² is obtained, which was not obtained in the third example to the fifth example, and point C is plotted. Similarly, in the seventh example, the ratio w/r₁ between the thickness w of the second clad and the radius r₁ of the core is increased, so that it was made possible that a solution in which the effective area $A_{eff}$ of the core is 110 μm² is obtained, which was not obtained in the third example to the sixth example, and point D is plotted. As described above, it was shown that the ratio W/r₁ between the thickness w of the second clad and the radius r₁ of the core is increased, so that a much larger effective area (effective area) can be provided, optical distortion can be reduced, and the communication quality can be improved.

Figure 13:
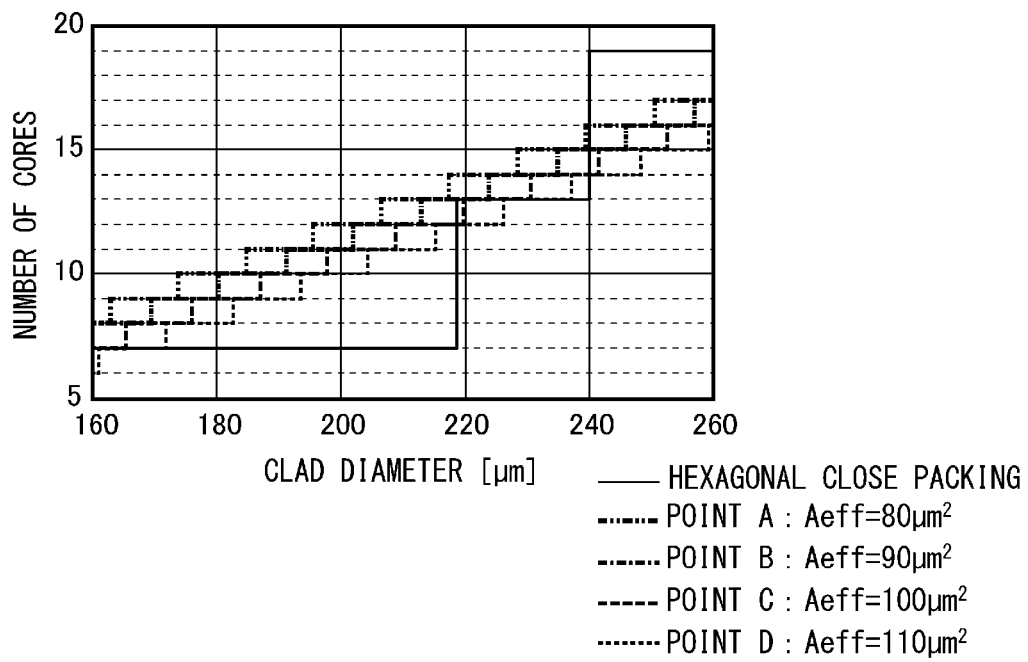
FIG. 13 is a diagram of the relationship between the outer diameter of a clad and the number of cores at point A to point D according to the third example to the seventh example.

Next, FIG. 13 is the relationship between the outer diameter of the clad and the number of the cores at point A to point D in the third example to the seventh example. It is noted that FIG. 13 also depicts the relationship between the outer diameter of the clad and the number of the cores in the case of previously existing hexagonal close packing depicted in FIG. 2. As depicted in FIG. 13, in accordance with the multi-core fibers according to the third example to the seventh example, the effective area $A_{eff}$ of the core is appropriately changed, so that six to fourteen core elements can be disposed according to the outer diameter of the clad in the range of the clad diameter in which only seven core elements can be disposed in the previously existing multi-core fiber (diameters from 160 μm to 219 μm), and sixteen cores at the maximum can be disposed in the range of the clad diameter in which only thirteen core elements can be disposed in the previously existing multi-core fiber (diameters from 219 μm to 240 μm).

As described above, in accordance with the multi-core fiber according to the present invention, it is shown that a large number of cores can be disposed according to the outer diameter of the clad.

Eighth Example

Figure 14:
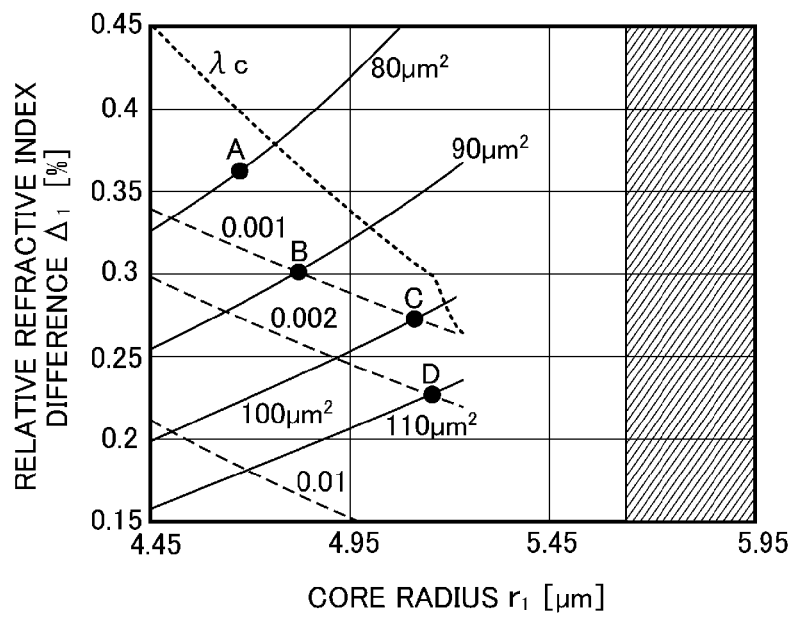
FIG. 14 is a diagram of plotting the distributions of the effective area of a core, the coupling coefficient, and the cutoff wavelength with respect to the radius of the core and the refractive index difference of the core with respect to a clad according to an eight example.

The effective area $A_{eff}$ of a core, the coupling coefficient κ, and the distribution of the cutoff wavelength λc were examined with respect to the radius r₁ of the core and the refractive index difference Δ₁ of the core with respect to a clad as similar to the seventh example except that the core pitch Λ was 36 μm. This is depicted in FIG. 14. Point A was a point at which the effective area $A_{eff}$ has the coupling coefficient κ and a solution on a line of 80 μm². Point B was a point at which the effective area $A_{eff}$ has the coupling coefficient κ and a solution on a line of 90 μm². Point C was a point at which the effective area $A_{eff}$ has the coupling coefficient κ and a solution on a line of 100 μm². Point D was a point at which the effective area $A_{eff}$ has the coupling coefficient κ and a solution on a line of 110 μm². As depicted in FIG. 14, a result was obtained that in the region on the left side of the cutoff wavelength λc that can be used for the optical fiber, point A can be plotted on the location at which the coupling coefficient κ is smaller than 0.001, both of point B and point C can be plotted on the line at which the coupling coefficient κ is 0.001, and point D can be plotted on the line at which the coupling coefficient κ is 0.002.

In the example, as shown from point C in FIG. 14, even in the case where the effective area $A_{eff}$ of the core is 100 μm², a solution exists in which the coupling coefficient κ is 0.001 m⁻¹. Thus, it is shown that such a multi-core fiber can be implemented in which crosstalk is further suppressed. Moreover, it is shown that even in the case where the effective area $A_{eff}$ of the core is 100 μm², a margin to the cutoff wavelength λc can be sufficiently provided.

Figure 15:
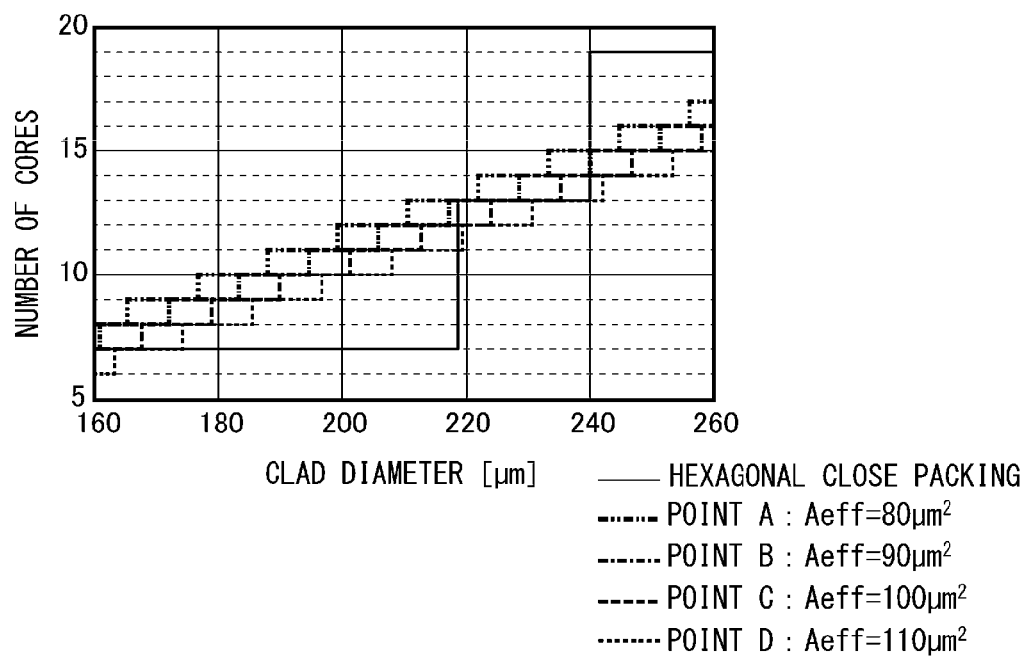
FIG. 15 is a diagram of the relationship between the outer diameter of a clad and the number of cores at point A to point D according to an eight example.

Next, FIG. 15 is the relationship between the outer diameter of the clad and the number of the cores at point A to point D according to the example. It is noted that FIG. 15 also depicts the relationship between the outer diameter of the clad and the number of the cores in the case of previously existing hexagonal close packing depicted in FIG. 2. As depicted in FIG. 15, in accordance with the multi-core fiber according to the eight example, the effective area $A_{eff}$ of the core is appropriately changed, so that six to thirteen cores can be disposed according to the outer diameter of the clad in the range of the clad diameter in which only seven core elements can be disposed in the previously existing multi-core fiber (diameters from 160 μm to 219 μm), and fifteen cores at the maximum can be disposed in the range of the clad diameter in which only thirteen core elements can be disposed in the previously existing multi-core fiber (diameters from 219 μm to 240 μm).

As described above, in accordance with the multi-core fiber according to the present invention, it is shown that a large number of cores can be disposed according to the outer diameter of the clad.

Figure 16:
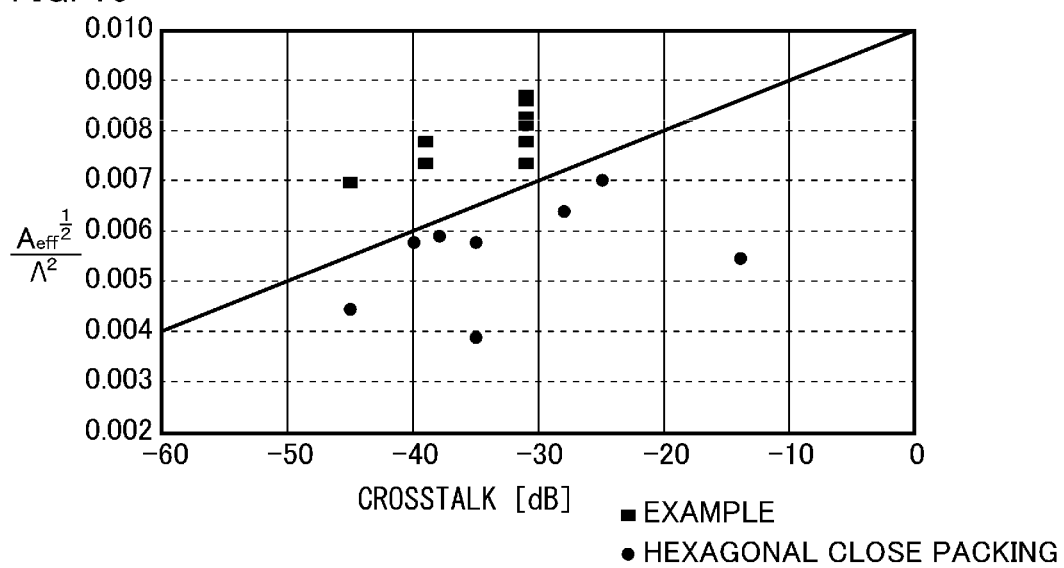
FIG. 16 is a diagram of the relationship between the crosstalk and a ratio between the square root of an effective area $A_{eff}$ of a core and the square of a core pitch $\Lambda$ according to the first example to the eighth example.

Next, the relationship between the ratio to the core pitch Λ and the crosstalk is examined in the multi-core fibers according to the first example to the eighth example and the multi-core fiber in the case of previously existing hexagonal close packing. FIG. 16 is the relationship between the crosstalk and a ratio between the square root of the effective area $A_{eff}$ of the core and the square of the core pitch Λ. In FIG. 16, crosstalk in the case where light propagates through the cores for 100 km is XT (dB), the effective areas of the cores are $A_{eff}$ (μm²), and an inter-center pitch between cores adjacent to each other is Λ. It is noted that in FIG. 16, marks expressed by a rectangle express the multi-core fibers according to the first example to the eighth example, marks expressed by a circle express a multi-core fiber in the case of previously existing hexagonal close packing, and a straight line is a line expressing Expression (4) below.

$$\frac{A_{eff}^{\frac{1}{2}}}{\Lambda^2} = 0.0001XT + 0.01 \quad (4)$$

Thus, as depicted in FIG. 16, it is shown that the multi-core fibers according to the first example to the eighth example satisfy Expression (5) below.

$$\frac{A_{eff}^{\frac{1}{2}}}{\Lambda^2} \geq 0.0001XT + 0.01 \quad (5)$$

As described above, the multi-core fibers according to the first example to the eighth example satisfy Expression (5) above, so that it is shown that a low crosstalk can be implemented while further reducing the core pitch $\Lambda$.

Thus, according to the present invention, it was possible to confirm that a larger number of the core elements can be disposed according to the outer diameter of the clad because a low crosstalk can be suppressed while reducing the core pitch.

INDUSTRIAL APPLICABILITY

As described above, according to the present invention, there is provided a multi-core fiber that can dispose a large number of cores according to the outer diameter of a clad while suppressing the crosstalk between cores adjacent to each other, and the multi-core fiber can be excellently used for communication cables, for example.

REFERENCE SIGNS LIST

1 . . . Multi-core fiber
10 . . . Core element
11 . . . Core
12 . . . First clad
13 . . . Second clad
20 . . . Clad
31 . . . Inner protective layer
32 . . . Outer protective layer

The invention claimed is:

1. A multi-core fiber comprising:
six or more of core elements, each of the core elements including:
a core;
a first clad surrounding an outer circumferential surface of the core; and
a second clad surrounding an outer circumferential surface of the first clad; and
a clad surrounding the core elements, wherein:
all of expressions are satisfied:

$n_1 > n_2 > n_3$ $n_1 > n_4$ $n_3 < n_4$ wherein a refractive index of the core is $n_1$, a refractive index of the first clad is $n_2$, a refractive index of the second clad is $n_3$, and a refractive index of the clad is $n_4$;
the core elements are disposed so that an inter-center pitch between the cores adjacent to each other is disposed at regular spacings and centers of the cores are annularly disposed, and
wherein an expression is satisfied:

$$\frac{A_{eff}^{\frac{1}{2}}}{\Lambda^2} \geq 0.0001XT + 0.01$$

wherein crosstalk when light propagates through the cores for 100 km is XT (dB), effective areas of the cores are $A_{eff}$ ($\mu m^2$), and an inter-center pitch between the cores adjacent to each other is $\Lambda$.

2. The multi-core fiber according to claim 1, wherein when a number of the core elements is n, the cores are disposed in an n-sided regular polygon.

3. The multi-core fiber according to claim 1, wherein when a number of the core elements is n, the cores are disposed in a regular polygon in which n is a number of six or more that is divided by an integer of two or more and the cores are disposed at vertices whose number is a number that n is divided by the integer.

4. The multi-core fiber according to claim 3, wherein:
a number of the core elements is a multiple of six, which is 12 or more; and
the cores are disposed in a regular hexagon.

5. The multi-core fiber according to claim 1, wherein a difference of an effective area between of the cores is within 20 ($\mu m^2$).

6. The multi-core fiber according to claim 1, wherein none of the core elements element is disposed at the center of the clad.

7. The multi-core fiber according to claim 1, wherein the refractive index of the first clad $n_2$ and the refractive index of the clad $n_4$ are different from each other.

* * * * *